US011897287B2

(12) United States Patent
Kawanoue et al.

(10) Patent No.: US 11,897,287 B2
(45) Date of Patent: Feb. 13, 2024

(54) TIRE

(71) Applicant: Sumitomo Rubber Industries, Ltd., Kobe (JP)

(72) Inventors: Takahiro Kawanoue, Kobe (JP); Daiki Imai, Kobe (JP); Saori Yoshida, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 1 day.

(21) Appl. No.: 17/511,792

(22) Filed: Oct. 27, 2021

(65) Prior Publication Data
US 2022/0153064 A1 May 19, 2022

(30) Foreign Application Priority Data

Nov. 17, 2020 (JP) .................. 2020-191113

(51) Int. Cl.
*B60C 11/03* (2006.01)
*B60C 11/13* (2006.01)
*B60C 11/12* (2006.01)

(52) U.S. Cl.
CPC ...... *B60C 11/0302* (2013.01); *B60C 11/0304* (2013.01); *B60C 11/125* (2013.01); *B60C 11/1307* (2013.01)

(58) Field of Classification Search
CPC ............. B60C 11/0302; B60C 11/0304; B60C 11/125; B60C 11/1307; B60C 11/1392;
(Continued)

(56) References Cited

U.S. PATENT DOCUMENTS 6,408,908 B1 * 6/2002 Scarpitti ............. B60C 11/0332
152/904
2012/0118455 A1 * 5/2012 Hada ................... B60C 11/0304
152/209.8
(Continued)

FOREIGN PATENT DOCUMENTS

JP       2007001484 A  *  1/2007
JP       2018-140745 A     9/2018

OTHER PUBLICATIONS

Shiraishi, English Machine Translation of JP 2007001484, 2007 (Year: 2007).*

*Primary Examiner* — Justin R Fischer
*Assistant Examiner* — Brendon Charles Darby
(74) *Attorney, Agent, or Firm* — Birch, Stewart, Kolasch & Birch, LLP

(57) ABSTRACT

A tire includes a tread portion including first and second tread edges, a first shoulder land portion including the first tread edge, and a first shoulder circumferential groove located inwardly in a tire axial direction of and adjacent to the first shoulder land portion and extending continuously in a tire circumferential direction. The first shoulder land portion is provided with a plurality of first shoulder lateral grooves extending from the first shoulder circumferential groove across the first tread edge, each of the plurality of first shoulder lateral grooves has a pair of first groove walls, and the pair of first groove walls is provided with a pair of first chamfer portions that extends from the first shoulder circumferential groove to a first location beyond the first tread edge.

19 Claims, 10 Drawing Sheets

(58) Field of Classification Search
CPC ............ B60C 11/1369; B60C 11/1384; B60C 11/0332; B60C 11/01
See application file for complete search history.

(56) References Cited

U.S. PATENT DOCUMENTS

| | | | |
|---|---|---|---|
| 2015/0075686 A1* | 3/2015 | Suga | B60C 11/04 152/209.16 |
| 2015/0210121 A1* | 7/2015 | Sanae | B60C 11/0304 152/209.8 |
| 2018/0170114 A1* | 6/2018 | Hayashi | B60C 11/12 |
| 2019/0023077 A1* | 1/2019 | Speziari | B60C 11/1307 |
| 2019/0152268 A1* | 5/2019 | Kanamura | B60C 11/0008 |
| 2020/0114696 A1* | 4/2020 | Tanabe | B60C 11/1236 |

* cited by examiner

TIRE

CROSS REFERENCE TO RELATED APPLICATION

This application claims the benefit of foreign priority to Japanese Patent Application No. JP2020-191113, filed Nov. 17, 2020, which is incorporated by reference in its entirety.

BACKGROUND ART

Field of the Disclosure

The present disclosure relates to a tire.

Description of the Related Art

The patent document 1 below discloses a pneumatic tire with a tread portion having a designated mounting direction to a vehicle, the tread portion being provided with outer shoulder lateral grooves and inner shoulder lateral grooves. In a pneumatic tire, the intersections of the groove edges of the outer shoulder lateral grooves and the outboard tread edge, and the intersections of the groove edges of the inner shoulder lateral grooves and the inboard tread edge are provided at different positions in the tire circumferential direction.

Patent Document

[Patent document 1] Japanese Unexamined Patent Application Publication 2018-140745

SUMMARY OF THE DISCLOSURE

In the above-mentioned pneumatic tire, the block edges facing the shoulder lateral grooves of the shoulder blocks is slippery with respect to the ground when the vehicle drives or brakes. As a result, there is a problem that heel-and-toe wear (hereinafter may be referred to as "H&T wear") in which the block edges wear at an early stage is likely to occur.

The present disclosure has been made in view of the above circumstances and has a major object to provide a tire capable of preventing uneven wear such as H&T wear.

In one aspect of the present disclosure, a tire includes a tread portion including axially spaced first and second tread edges that are axially outermost edges of a ground contacting patch of the tire which occurs under a condition such that a 70% standard tire load is applied to the tire placed under a normal state, wherein the normal state is such that the tire is mounted onto a standard wheel rim and inflated to a standard pressure, a first shoulder land portion including the first tread edge, and a first shoulder circumferential groove located inwardly in a tire axial direction of and adjacent to the first shoulder land portion and extending continuously in a tire circumferential direction, wherein the first shoulder land portion is provided with a plurality of first shoulder lateral grooves extending from the first shoulder circumferential groove across the first tread edge, each of the plurality of first shoulder lateral grooves has a pair of first groove walls, and the pair of first groove walls is provided with a pair of first chamfer portions that extends from the first shoulder circumferential groove to a first location beyond the first tread edge.

DESCRIPTION OF THE PREFERRED EMBODIMENTS

Figure 1:
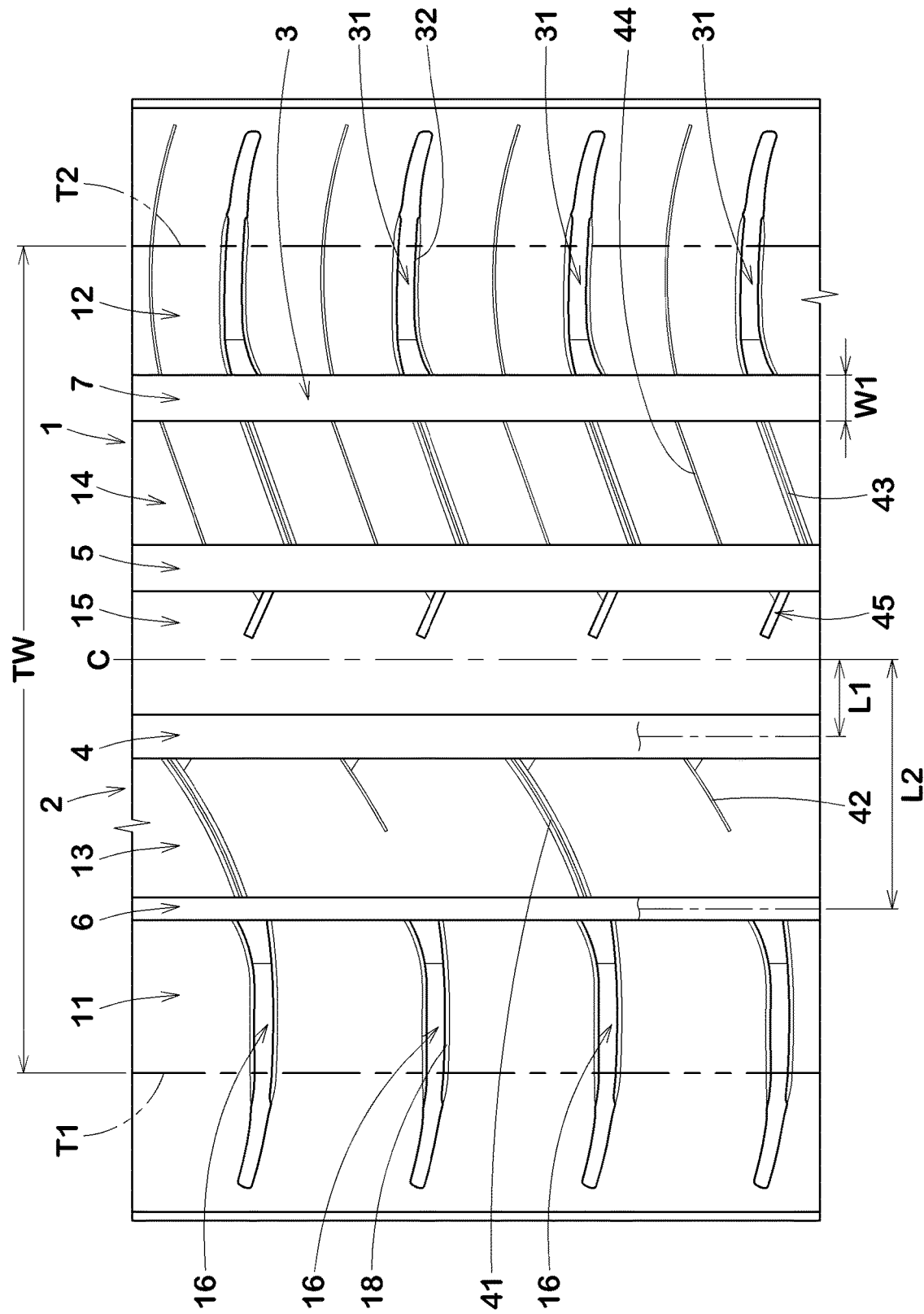
FIG. 1 is a development view of a tread portion of a tire according to an embodiment of the present disclosure.

An embodiment of the present disclosure will be explained below with reference to the accompanying drawings. FIG. 1 is a development view of a tread portion 2 of a tire 1 according to an embodiment. As illustrated in FIG. 1, the tire 1 according to the present embodiment, for example, is a pneumatic passenger car tire, especially being a summer tire. Note that the present disclosure is not limited to such an aspect and may be used for all-season tire, heavy-duty tire, and the like.

The tire 1 according to the present embodiment, for example, includes the tread portion 2 having a designated mounting direction to a vehicle. In the present embodiment, the mounting direction to a vehicle is indicated by characters or marks on the sidewall portion, etc. (not shown), for example. Further, the tread portion 2, for example, has an asymmetric pattern (i.e., the tread pattern being not line-symmetrical with respect to the tire equator C). Alternatively, the tire 1 may be mounted on a vehicle in an unspecified direction, and the tread portion 2 may be configured as a symmetrical pattern.

The tread portion 2 includes axially spaced first tread edge T1 and second tread edge T2. The tread portion 2 according to the present embodiment has a designated mounting direction to a vehicle such that the first tread edge T1 is located on the outside of a vehicle when mounted on the vehicle and the second tread edge T2 is located on the inside of the vehicle when mounted on the vehicle. The first tread edge T1 and the second tread edge T2 are axially outermost edges of a ground contacting patch of the tire which occurs under a condition such that the tire 1 placed under a normal state is grounded on a plane with a 70% standard tire load at zero camber angles. The first tread edge T1 and the second tread edge T2 are close to the actual ground contact edges of the tread portion 2 when a vehicle is being stopped or traveling straight at a constant speed. Thus, the area located axially inwardly of the first and second tread edges T1 and T2 is always in contact with the ground unless the ground contact pressure becomes excessively low. On the other hand, areas around the first tread edge T1 and the second tread edge T2 tend to have a large change in ground contact pressure.

As used herein, the "normal state" is such that the tire 1 is mounted onto a standard wheel rim with a standard pressure but loaded with no tire load. Unless otherwise noted, dimensions of portions of the tire 1 are values measured under the normal state. If a tire is not based on the standards, or is a non-pneumatic tire, the normal state is a standard state of use according to the purpose of use of the tire, and means a state of no load. As used herein, unless otherwise noted, dimensions of portions of the tire 1 are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, the "standard tire load" is a tire load officially approved for each tire by standards organizations in which the tire is based, wherein the standard tire load is the "maximum load capacity" in JATMA, the maximum value given in the above-mentioned table in TRA, and the "Load Capacity" in ETRTO, for example. If a tire is not based on the standards, or is a non-pneumatic tire, the standard tire load refers to the load acting on the tire when the tire is under a standard mounting state. The "standard mounting state" refers to a state in which the tire is mounted on a standard vehicle according to the purpose of use of the tire, and the vehicle is stationary on a flat road surface while being able to run.

The tread portion 2 includes a plurality of circumferential grooves 3 extending continuously in the tire circumferential direction between the first tread edge T1 and the second tread edge T2, and a plurality of land portions divided by the circumferential grooves 3. The tire 1 according to the present embodiment is configured as a so-called five-rib tire in which the tread portion 2 has five ribs divided by four circumferential grooves 3. Note that the present disclosure is not limited to such an aspect, and the tire may be configured as a so-called four-rib tire in which the tread portion 2 has four ribs divided by three circumferential grooves 3, for example.

The circumferential grooves 3, for example, include a first crown circumferential groove 4, a second crown circumferential groove 5, a first shoulder circumferential groove 6 and a second shoulder circumferential groove 7. The first crown circumferential groove 4 and the second crown circumferential groove 5 are disposed such that the tire, heavy tire equator C is arranged therebetween. The first shoulder circumferential groove 6 is disposed between the first crown circumferential groove 4 and the first tread edge T1. The second shoulder circumferential groove 7 is disposed between the second crown circumferential groove 5 and the second tread edge T2.

In the present embodiment, the circumferential grooves 3 extend straight in the tire circumferential direction. Alternatively, the circumferential grooves 3 may extend in a zigzag manner.

A distance L1 in the tire axial direction from the tire equator C to the first crown circumferential groove 4 or the second crown circumferential groove 5 is in a range of from 5% to 15% of the tread width TW, for example. A distance L2 in the tire axial direction from the tire equator C to the first shoulder circumferential groove 6 or the second shoulder circumferential groove 7 is in a range of from 25% to 35% of the tread width TW, for example. Note that the tread width TW is a distance in the tire axial direction from the first tread edge T1 to the second tread edge T2 under the normal state.

Preferably, a groove width W1 of the circumferential grooves 3 is at least 3 mm. In some preferred embodiments, the groove width W1 of the circumferential grooves 3 is in a range of 2.0% to 6.0% of the tread width TW.

The land portions, at least, include a first shoulder land portion 11 including the first tread edge T1. In addition, the land portions according to the present embodiment include a second shoulder land portion 12 including the second tread edge T2.

Further, the land portions according to the present embodiment include a crown land portion 15, a first middle land portion 13 and a second middle land portion 14. The crown land portion 15 is defined between the first crown circumferential groove 4 and the second crown circumferential groove 5. The first middle land portion 13 is defined between the first crown circumferential groove 4 and the first shoulder circumferential groove 6. The second middle land portion 14 is defined between the second crown circumferential groove 5 and the second shoulder circumferential groove 7.

Figure 2:
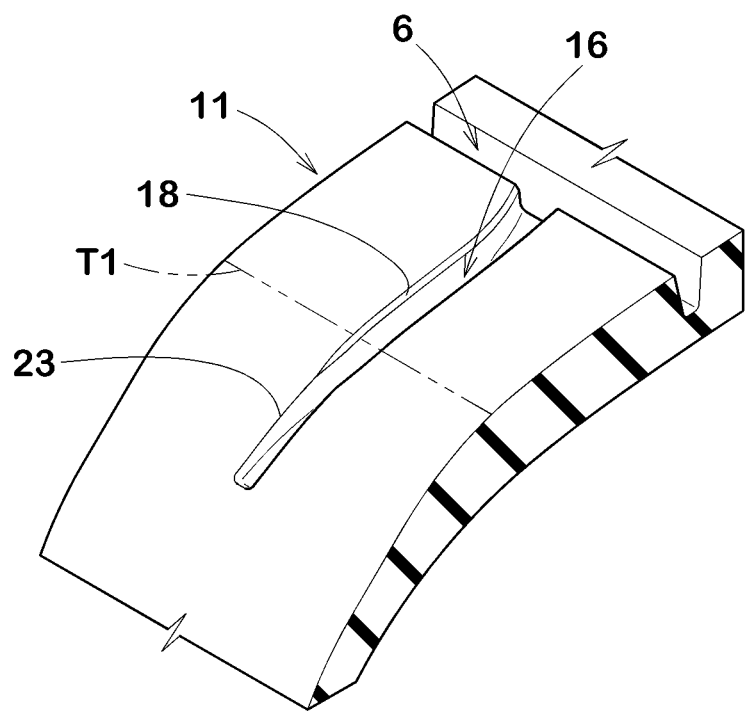
FIG. 2 is a partial enlarged perspective view of a first shoulder land portion of FIG. 1.
Figure 3:
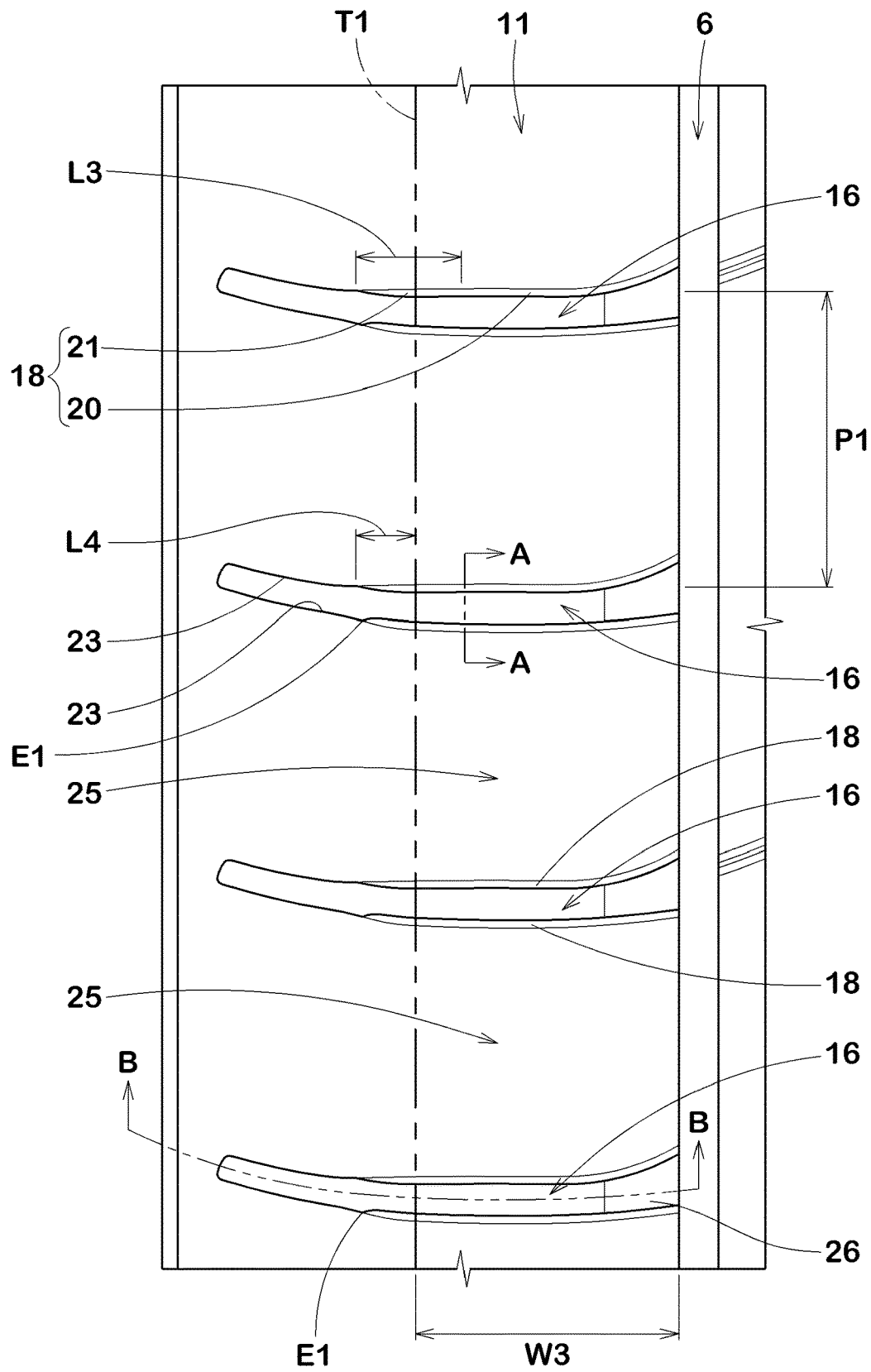
FIG. 3 is a partial enlarged view of the first shoulder land portion.

FIG. 2 is a partial enlarged perspective view of the first shoulder land portion 11 of FIG. 1. FIG. 3 is a partial enlarged view of the first shoulder land portion 11 of FIG. 1. As illustrated in FIG. 2 and FIG. 3, the first shoulder land portion 11 is provided with a plurality of first shoulder lateral grooves 16 extending from the first shoulder circumferential groove 6 across the first tread edge T1.

Figure 4:
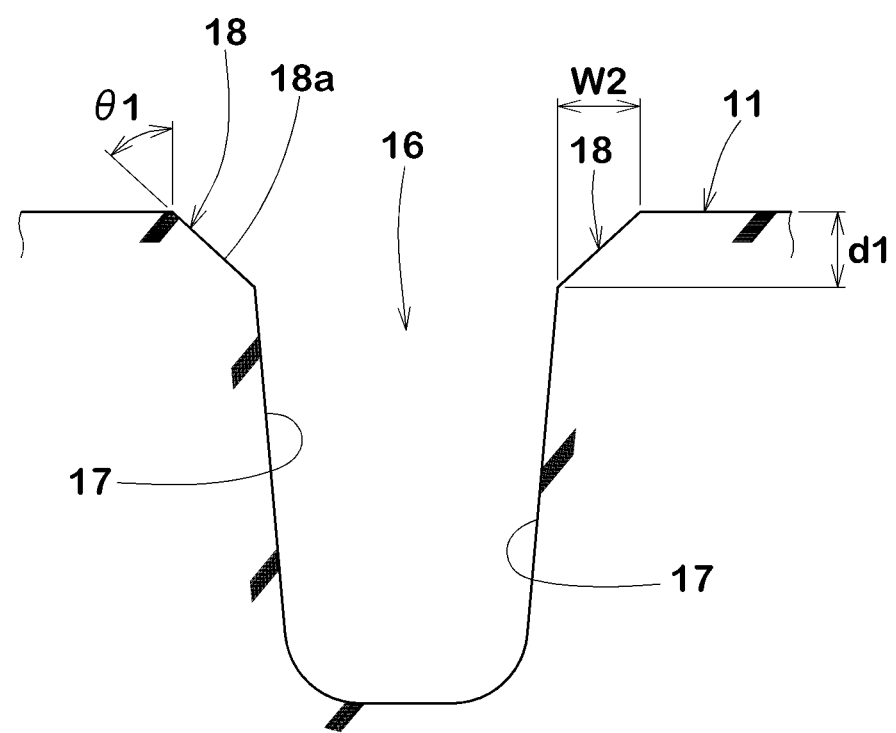
FIG. 4 is a cross-sectional view taken along the line A-A of FIG. 3.

FIG. 4 is a cross-sectional view taken along the line A-A of FIG. 3. As illustrated in FIG. 4, each first shoulder lateral groove 16 has a pair of first groove walls 17. The pair of first groove walls 17 is provided with a pair of first chamfer portions 18 inclined with respect to an outer surface of the first shoulder land portion 11. In addition, as illustrated in FIG. 3, in a tread plan view, the pair of first chamfer portions 18 extends from the first shoulder circumferential groove 6 to a first location beyond the first tread edge T1. The tire 1 according to the present disclosure can prevent uneven wear such as H&T wear by adopting the above configuration. The reason for this is presumed to be the following mechanism.

In the present disclosure, the pair of first chamfer portions 18 tends to exert a uniform contact pressure on the groove edges on both sides of the first shoulder lateral grooves 16, and thus H & T wear is effectively prevented. In particular, since the pair of first chamfer portions 18 extends beyond the first tread edge T1, uneven wear is effectively prevented in the vicinity of the first tread edge T1 where the change in the acting ground pressure is large. In the present disclosure, it is presumed that such a mechanism can effectively prevent uneven wear such as H&T wear.

In the present disclosure, due to the pair of first chamfer portions 18, the ground pressure acting on the first shoulder land portion 11 may be equalized. By such an action, the first shoulder land portion 11 can properly generates a cornering force and improve steering stability at lane changes and gentle curves.

Hereinafter, a more detailed and preferred configuration of the present embodiment will be described. Note that each configuration described below shows a specific aspect of the present embodiment. Thus, the present disclosure can exert the above-mentioned effects even if the tire does not include the configuration described below. Further, even if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

As illustrated in FIG. 4, a chamfer width W2 of the first chamfer portions which is measured along an outer surface of the first shoulder land portion 11 is in a range of from 1 to 3 mm, for example. Preferably, the chamfer width W2 of the first chamfer portions is equal to or more than 4.0% of a width W3 (shown in FIG. 3) in the tire axial direction of the ground contact surface of the first shoulder land portion 11, more preferably equal to or more than 5.0%, and preferably equal to or less than 7.0%, more preferably equal to or less than 6.0%.

A chamfer depth d1 of the first chamfer portions 18, for example, is in a range of from 1 to 3 mm. An angle θ1 of inclined surfaces 18a of the pair of first chamfer portions 18 with respect to the tire normal is in a range of from 40 to 60 degrees, for example. Note that the above-mentioned tire normal is a virtual straight line that passes through the groove edge of the first shoulder lateral grooves 16 and extends at a right angle to the outer surface of the first shoulder land portion 11.

As illustrated in FIG. 3, the pair of first chamfer portions 18 terminates at the first location E1 beyond the first tread edge T1 in the tire axial direction. The first location E1 is a location within 5 mm from the first tread edge T1.

In a tread plan view, each first chamfer portion 18 includes a constant-width portion 20 having a constant chamfer width, and a variable-width portion 21 having a chamfer width varying in a longitudinal direction of the first shoulder lateral groove 16. The constant-width portion 20, for example, extends axially outwardly from the first shoulder circumferential groove 6 to a location just before the first tread edge T1. The variable-width portion 21 is connected to the constant-width portion 20 and extends across the first tread edge T1. The variable-width portion 21 has a chamfer width reducing continuously toward outwardly in the tire axial direction. Thus, uneven wear around the ends of the first chamfer portions 18 can be prevented effectively.

In order to ensure the above effects, a length L3 in the tire axial direction of the variable-width portion 21 is preferably in a range of from 30% to 45% of the width W3 in the tire axial direction of the ground contacting surface of the first shoulder land portion 11.

Each first shoulder lateral groove 16 includes a pair of non-chamfered groove edges 23 that extends outwardly in the tire axial direction from the first location E1 of the pair of first groove walls 17. The non-chamfered groove edges 23 mean that the first groove walls 17 and the ground contacting surface of the first shoulder land portion 11 are directly connected to each other to form edge components that scratch the ground and increase the frictional force when grounding.

In the present embodiment, in a situation where the contact pressure acting on the first shoulder land portion 11 increases during braking and an area outside in the tire axial direction from the first tread edge T1 comes into contact with the ground, the non-chamfered groove edge 23 comes into contact with the ground, increasing the frictional force in the tire circumferential direction, for example. Thus, the non-chamfered groove edges 23 can help to improve braking performance on dry and wet roads.

As illustrated in FIG. 3, in the present embodiment, the first location E1 is a location within 5 mm from the first tread edge T1. In other words, the distance L4 from the first tread edge T1 to the non-chamfered groove edges 23 is equal to or less than 5 mm. This makes it easier for the non-chamfered groove edges 23 to come into contact with the ground during braking, and a large frictional force can be obtained.

A length of the non-chamfered groove edges 23 which is a periphery length in a view when the tread portion 2 is developed on a plane, for example, is in a range of from 40% to 70% of the width W3 in the tire axial direction of the first shoulder land portion 11. The non-chamfered groove edges 23 having such a length can help to improve braking performance effectively.

Figure 5:
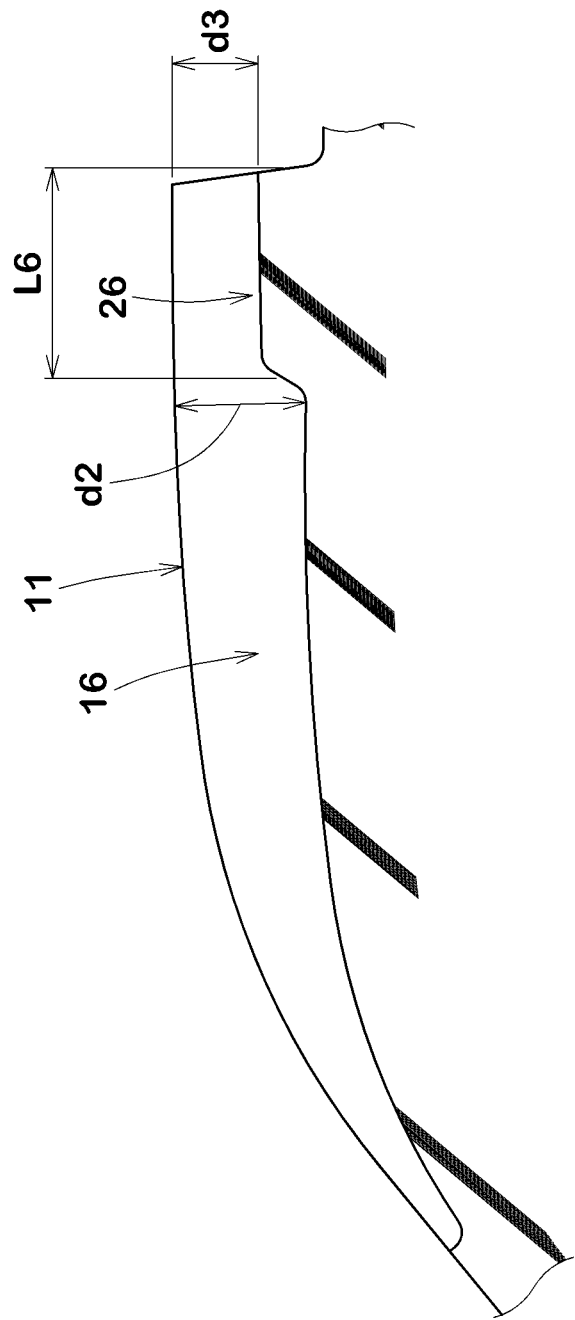
FIG. 5 is a cross-sectional view taken along the line B-B of FIG. 3.

FIG. 5 illustrates a cross-sectional view taken along the line B-B of FIG. 3. As illustrated in FIG. 5, at least one of the first shoulder lateral grooves 16 is provided with a first tie-bar 26 where a groove bottom thereof raises locally. The first tie-bar 26 according to the present embodiment is arranged in an inner end portion in the tire axial direction of the at least one of the first shoulder lateral grooves 16. The first tie-bar 26 can enhance rigidity of the first shoulder land portion 11, improving steering stability.

A length L6 in the tire axial direction of the first tie-bar 26, for example, is preferably in a range of from 20% to 35% of the width W3 (shown in FIG. 3) of the ground contacting surface in the tire axial direction of the first shoulder land portion 11. When the length in the tire axial direction of the first tie-bar 26 changes depending on the position in the tire radial direction, the length L6 is measured by the center position of the first tie-bar 26 in the tire radial direction. In addition, a minimum groove depth d3 on the first tie-bar 26, for example, is in a range of from 60% to 75% of the maximum groove depth d2 of the first shoulder lateral groove 16. Such a first tie-bar 26 can improve steering stability while ensuring drainage performance of the at least one of the first shoulder lateral grooves 16.

As illustrated in FIG. 3, a pitch length P1 in the tire circumferential direction of the first shoulder lateral grooves 16, for example, is in a range of from 100% to 130% of the width W3 in the tire axial direction of the ground contacting surface of the first shoulder land portion 11. Thus, steering stability on dry roads and wet performance can be improved in a well-balanced manner. Note that a pitch length P1 is a length in the tire circumferential direction between axially innermost ends of the groove centerlines of circumferentially adjacent two first shoulder lateral grooves 16.

In some more preferred embodiments, the first shoulder land portion 11 includes a plurality of first shoulder blocks 25 divided by the plurality of first shoulder lateral grooves 16. In addition, no sipes nor grooves are provided on the first shoulder land portion 11 except for the plurality of first shoulder lateral grooves 16. Such a first shoulder land portion 11 can have high rigidity and can further improve steering stability.

Figure 6:
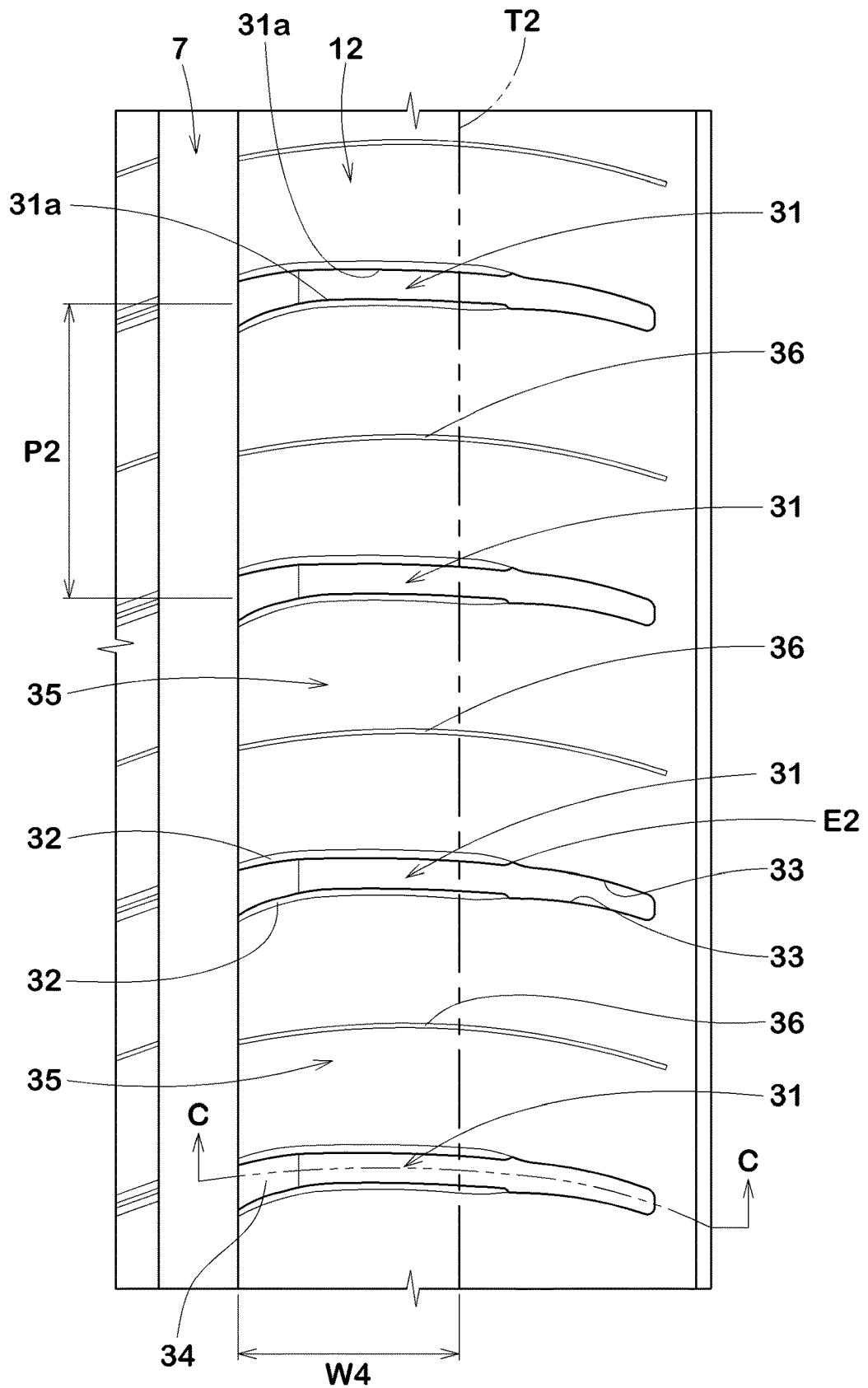
FIG. 6 is a partial enlarged view of a second shoulder land portion of FIG. 1.

FIG. 6 illustrates a partial enlarged view of the second shoulder land portion 12. As illustrated in FIG. 6, the second shoulder land portion 12 is provided with a plurality of second shoulder lateral grooves 31. The plurality of second shoulder lateral grooves 31 extends from the second shoulder circumferential groove 7 across the second tread edge T2.

Each of the second shoulder lateral grooves 31 includes a pair of second groove walls 31a. In addition, the pair of second groove walls 31a is provided with a pair of second chamfer portions 32 that extends from the second shoulder circumferential groove 7 to a second location E2 beyond the second tread edge T2. As a result, steering stability and uneven wear resistance can further be improved by the same mechanism as described above.

Note that the second chamfer portions 32 have substantially the same configuration as the first chamfer portions 18. Thus, the configuration of the first chamfer portions 18 described above can be applied to the second chamfer portions 32, and the description thereof is not repeated. The pair of second chamfer portions 32 terminate at the second location E2 in the tire axial direction. The second location E2 is a location within 5 mm from the second tread edge T2. In addition, the pair of second groove walls 31a includes a pair of non-chamfered groove edges 33 arranged axially outwardly of the second location E2. As a result, the braking performance can further be improved.

A pitch length P2 in the tire circumferential direction of the second shoulder lateral grooves 31, for example, is in a range of from 80 to 120% of the pitch length P1 in the tire circumferential direction of the first shoulder lateral grooves 16.

Figure 7:
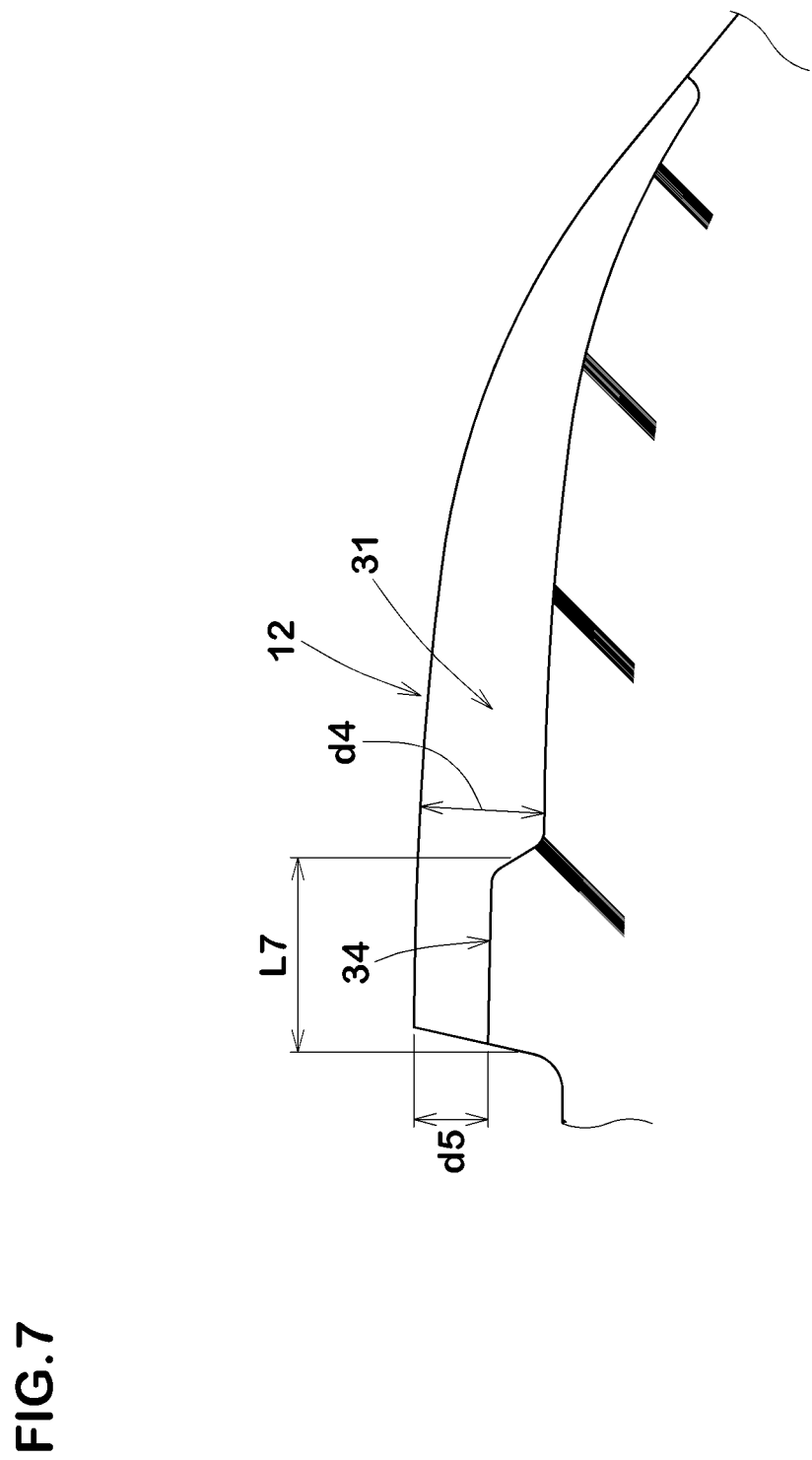
FIG. 7 is a cross-sectional view taken along the line C-C of FIG. 6.

FIG. 7 illustrates a cross-sectional view taken along the line C-C of FIG. 6. As illustrated in FIG. 7, at least one of the second shoulder lateral grooves 31 is provided with a second tie-bar 34 where a groove bottom thereof raises locally. The second tie-bar 34 according to the present embodiment is arranged in an inner end portion in the tire axial direction of the at least one of the second shoulder lateral grooves 31.

A length L7 in the tire axial direction of the second tie-bar 34, for example, is preferably in a range of from 20% to 35% of a width W4 (shown in FIG. 7) of the ground contacting surface in the tire axial direction of the second shoulder land portion 12. In addition, a minimum groove depth d5 on the second tie-bar 34, for example, is in a range of from 60% to 75% of the maximum groove depth d4 of the second shoulder lateral groove 31. Such a second tie-bar 34 can improve steering stability on dry roads and wet performance in a well-balanced manner.

Comparing the first tie-bar 26 (shown in FIG. 5) provided in the at least one of the first shoulder lateral grooves 16 with the second tie-bar 34 provided in the at least one of the second shoulder lateral grooves 31, the length in the tire axial direction of the first tie-bar 26 is preferably greater than the length in the tire axial direction of the second tie-bar 34. Such an arrangement of tie-bars relatively increases rigidity of the first shoulder land portion 11 and can help to exert excellent steering stability.

On the other hand, the groove depth at the first tie-bar 26 is preferably greater than the groove depth of the second tie-bar 34. Thus, drainage performance of the at least one of the first shoulder lateral grooves 16 can be ensured, and wet performance of the tire can be maintained.

As illustrated in FIG. 6, the second shoulder land portion 12 includes a plurality of second shoulder blocks 35 divided by the plurality of second shoulder lateral grooves 31. In the present embodiment, an area of the ground contacting surface of one of the first shoulder blocks 25 (shown in FIG. 3) is preferably greater than an area of the ground contact surface of one of the second shoulder blocks 35. Specifically, the above-mentioned area of one of the first shoulder blocks 25 is preferably in a range of from 110% to 120% of the above-mentioned area of one of the second shoulder blocks 35. As a result, excellent steering stability can be exhibited while maintaining uneven wear resistance.

The second shoulder blocks 35 are provided with a plurality of shoulder sipes 36 extending along the plurality of second shoulder lateral grooves 31. In the present embodiment, the second shoulder lateral grooves 31 and the shoulder sipes 36 are arranged alternately in the tire circumferential direction. As used herein, "sipe" shall mean an incision that has a narrow width and a width between inner wall surfaces facing with each other is equal to or less than 1.5 mm, more preferably 0.3 to 1.0 mm. Note that an opening of sipe may be provided with a chamfer portion that defines an opening width more than 1.5 mm. In addition, note that a bottom of sipe may be provided with a flask shaped groove that has a width more than 1.5 mm.

The shoulder sipes 36, for example, extend from the second shoulder circumferential groove 7 across the second tread edge T2. Such shoulder sipes 36 can suppress distortion of a ground contacting surface of the second shoulder land portion 12, preventing uneven wear thereof.

Preferably, each shoulder sipe 36, for example, includes a shallow bottom portion (not illustrated) at an inner end portion in the tire axial direction. A depth of the shallow bottom portion, for example, is in a range of 35% to 45% of the maximum depth of the shoulder sipe 36.

Figure 8:
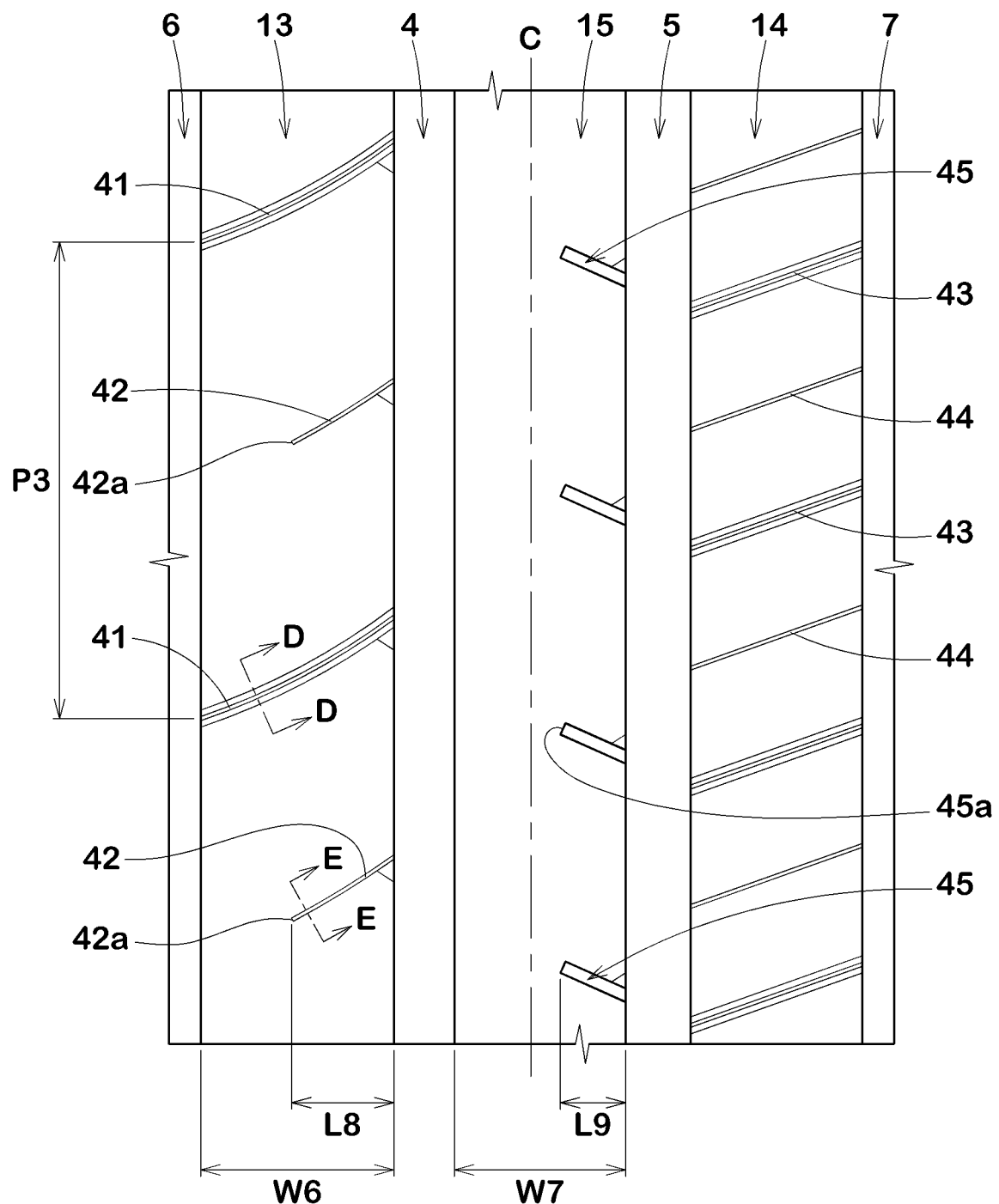
FIG. 8 is a partial enlarged view of a first middle land portion, a crown land portion and a second middle land portion of FIG. 1.

FIG. 8 illustrates a partial enlarged view of the tread portion 2 including the first middle land portion 13, the crown land portion 15 and the second middle land portion 14. As illustrated in FIG. 8, the first middle land portion 13 is provided with a plurality of first middle sipes 41 and a plurality of second middle sipes 42 which are arranged alternately in the tire circumferential direction. The first middle sipes 41, for example, traverse the first middle land portion 13 entirely in the tire axial direction. The second middle sipes 42, for example, extend from the first crown circumferential groove 4 and terminate to have closed ends 42a within the first middle land portion 13.

The first middle sipes 41, for example, are inclined in a first direction (upward to the right in FIG. 8) with respect to the tire axial direction. Preferably, an angle of the first middle sipes 41 with respect to the tire axial direction is greater than an angle of the first shoulder lateral grooves 16 with respect to the tire axial direction, and is in a range of 20 to 40 degrees, for example. Such first middle sipes 41 can provide frictional force not only in the tire circumferential direction, but also in the tire axial direction.

Figure 9:
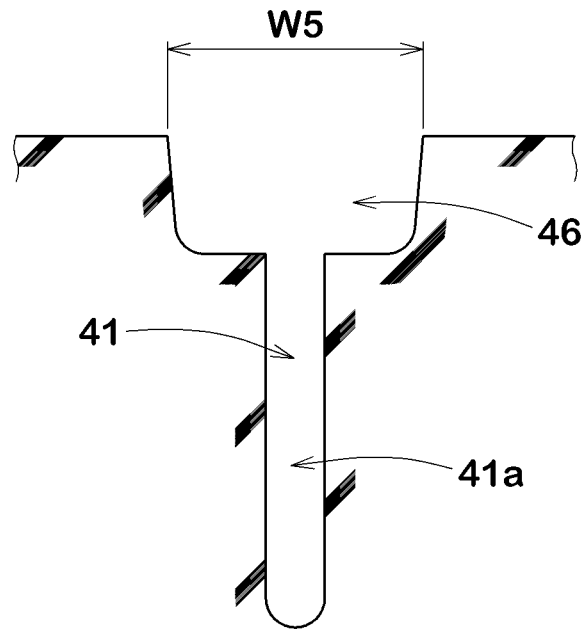
FIG. 9 is a cross-sectional view taken along the line D-D of FIG. 8.

FIG. 9 illustrates a cross-sectional view taken along the line D-D of FIG. 8. As illustrated in FIG. 9, the first middle sipes 41 each include a main portion 41a and a pair of chamfer portions 46 connected to the main portion 41a and having a width greater than that of the main portion 41a. Preferably, an opening width W5 of the chamfer portion 46 is greater than the chamfer width W2 (shown in FIG. 4) of the first chamfer portions 18 of one or more first shoulder lateral grooves 16. Thus, the wear of the first shoulder land portion 11 and the first middle land portion 13 may progress uniform, and uneven wear resistance may be improved.

As illustrated in FIG. 8, a pitch length P3 of the first middle sipes 41 in the tire circumferential direction is preferably greater than the pitch length P1 of the first shoulder lateral grooves 16 (shown in FIG. 3). Specifically, the pitch length P3 is in a range of from 150% to 250% of the pitch length P1. This structure can help to suppress uneven wear of the first middle land portion 13.

As illustrated in FIG. 1, axially outer ends of the first middle sipes 41, which are located on the first shoulder circumferential groove side, overlap respective projected regions in which axially inner ends of the first shoulder lateral grooves 16 are expanded in parallel with the tire axial direction onto the first shoulder circumferential groove 6.

Thus, the first shoulder lateral grooves 16 tend to open easily when grounding, resulting in improving wet performance.

As illustrated in FIG. 8, the second middle sipes 42 are inclined in the first direction with respect to the tire axial direction. Preferably, the second middle sipes 42 extend along the first middle sipes 41. In the present embodiment, the angle difference between the second middle sipes 42 and the first middle sipes 41 is equal to or less than 5 degrees. In addition, a length L8 in the tire axial direction of the second middle sipes 42 is preferably in a range of from 40% to 60% of a width W6 in the tire axial direction of the ground contacting surface of the first middle land portion 13.

Figure 10:
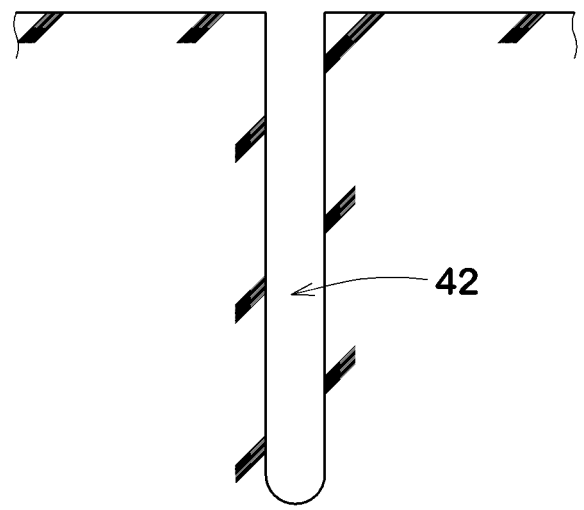
FIG. 10 is a cross-sectional view taken along the line E-E of FIG. 8.

FIG. 10 illustrates a cross-sectional view taken along the line E-E of FIG. 8. As illustrated in FIG. 10, each second middle sipe 42, for example, includes a pair of sipe walls that connected to the ground contact surface of the first middle land portion 13 directly to form a pair of sharp edges. The second middle sipes 42 can provide a large friction force using the edges, helping to improve braking performance.

As illustrated in FIG. 8, the crown land portion 15 is provided with a plurality of the crown lateral grooves 45. The crown lateral grooves 45, for example, extend from the second crown circumferential groove 5 and terminate to have closed ends 45a within the crown land portion 15. The crown lateral grooves 45, for example, are inclined in the second direction (downward to the right in FIG. 8) which is opposite to the first direction with respect to the tire axial direction. An angle of the crown lateral grooves 45 with respect to the tire axial direction, for example, is in a range of from 10 to 30 degrees. Such crown lateral grooves 45 can exert frictional force in a direction different from that of the first middle sipes 41, and braking performance can be further improved.

The crown lateral grooves 45, for example, do not traverse the tire equator C. and do not traverse the center location in the tire axial direction of the crown land portion 15. A length L9 in the tire axial direction of the crown lateral grooves 45 is preferably smaller than the length L8 in the tire axial direction of the second middle sipes 42. Specifically, the length L9 of the crown lateral grooves 45 is in a range of from 35% to 45% of a width W7 in the tire axial direction of the crown land portion 15. The crown lateral grooves 45 can improve wet performance while maintaining uneven wear resistance.

The second middle land portion 14 is provided with a plurality of third middle sipes 43 and a plurality of the fourth middle sipes 44 which are arranged alternately in the tire circumferential direction. The third middle sipes 43 and the fourth middle sipes 44 traverse the second middle land portion 14 entirely in the tire axial direction. The third middle sipes 43 and the fourth middle sipes 44, for example, are inclined in the first direction with respect to the tire axial direction. An angle of the third middle sipes 43 with respect to the tire axial direction and an angle of the fourth middle sipes 44 with respect to the tire axial direction are preferably in a range of 10 to 30 degrees.

The third middle sipes 43 each, for example, have the same cross-sectional shape as the first middle sipes 41 shown in FIG. 9. That is, each third middle sipe 43 includes a main portion and a pair of chamfer portions having a greater width than the main portion. The third middle sipes 43 can suppress uneven wear of the second middle land portion 14.

The fourth middle sipes 44 each, for example, have the same cross-sectional shape as the second middle sipes 42 shown in FIG. 10. That is, the fourth middle sipes 44 includes a pair of sipe walls that connected to the ground contact surface of the second middle land portion 14 directly to form a pair of sharp edges. The fourth middle sipes 44 can provide a large friction force. In the present embodiment, the above-mentioned third middle sipes 43 and the fourth middle sipes 44 which are arranged alternately in the tire circumferential direction can improve uneven wear resistance and braking performance in a well-balanced manner.

As illustrated in FIG. 1, axially outer ends of the third middle sipes 43, which are on the second shoulder circumferential groove 7 side, overlap respective projected regions in which axially inner ends of the second shoulder lateral grooves 31 are expanded in parallel with the tire axial direction onto the second shoulder circumferential groove 7. Thus, the second shoulder lateral grooves 31 tend to open easily when grounding, resulting in improving wet performance.

While the particularly preferable embodiments in accordance with the present disclosure have been described in detail, the present disclosure is not limited to the illustrated embodiments, but can be modified and carried out in various aspects.

EXAMPLE

Figure 11:
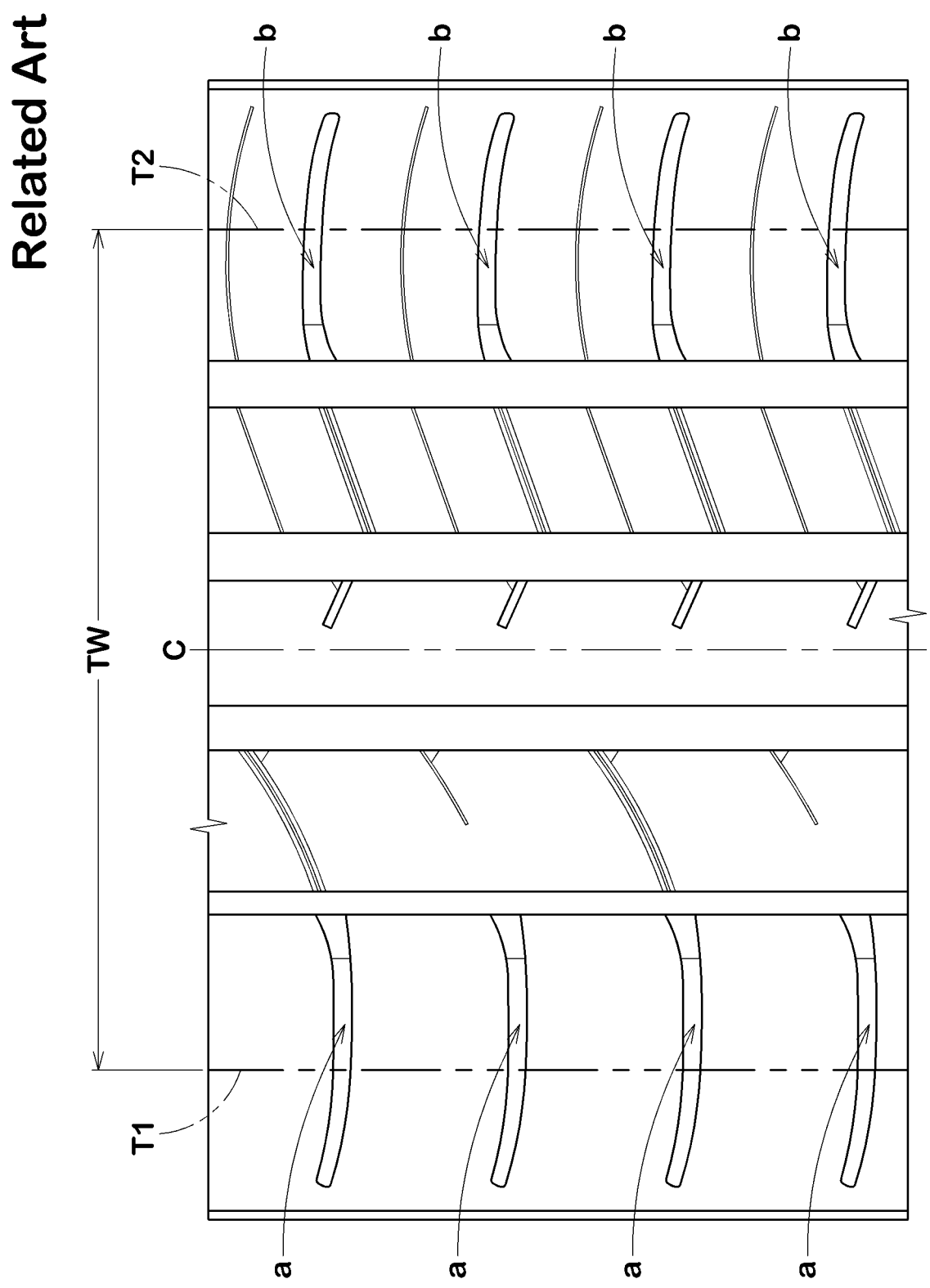
FIG. 11 is a development view of a tread portion of a tire according to a comparative example.

Tires having a size of 235/50R18 and a tread pattern shown in FIG. 1 were prototyped based on the specifications in Table 1. As a comparative example, a tire having a tread pattern shown in FIG. 11 was also prototyped. As illustrated in FIG. 11, in the tire of comparative example, no chamfer portions are provided on the first shoulder lateral grooves (a) and the second shoulder lateral grooves (b). Note that the tire of comparative example has the substantially same tread pattern shown in FIG. 1 except for the above chamfer structure. For each test tire, uneven wear resistance, steering stability and braking performance were tested. The common specifications and test methods for each test tire are as follows.

Rim size: 18×7.5J

Tire inner pressure: 230 kPa (all wheels)

Test vehicle: four-wheel-drive vehicle with displacement of 3000 cc

Tire location: all wheels

Uneven Wear Resistance Test:

After traveling a certain distance on the above test vehicle, the wear state of the first shoulder lateral grooves and the second shoulder lateral grooves (the degree of uneven wear such as H&T wear) was visually checked. The test results are indicated in Table 1 using a score with the wear state of the comparative example as 100. The larger the value, the better the uneven wear resistance is.

Steering Stability Test:

Steering stability of the above test vehicle when traveling on a dry road surface was evaluated by the driver's sensuality. The test results are indicated in table 1 using a score with steering stability of the comparative example as 100. The larger the value, the better the steering stability is.

Braking Performance Test:

The braking performance when driving on dry and wet roads with the above test vehicle was evaluated by the driver's sensuality. The test results are indicated in Table 1 using a score with braking performance of the comparative example as 100. The larger the value, the better the braking performance is.

Table 1 shows the test results.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Figure showing tread pattern | FIG. 11 | FIG. 1 | FIG. 1 | FIG. 1 | FIG. 1 | FIG. 1 | FIG. 1 | FIG. 1 | FIG. 1 | FIG. 1 |
| Chamfer width W2 of first chamfer portions/width W3 of first shoulder land portion (%) | — | 5.5 | 4.0 | 5.0 | 6.0 | 7.0 | 5.5 | 5.5 | 5.5 | 5.5 |
| Distance L4 from first tread edge to non-chamfer portions (mm) | 0 | 5.0 | 5.0 | 5.0 | 5.0 | 5.0 | 3.0 | 4.0 | 6.0 | 7.0 |
| Uneven wear resistance (score) | 100 | 108 | 104 | 106 | 108 | 109 | 105 | 107 | 108 | 108 |
| Steering stability (score) | 100 | 107 | 104 | 106 | 107 | 107 | 105 | 106 | 107 | 107 |
| Braking performance (score) | 100 | 100 | 100 | 100 | 100 | 98 | 100 | 100 | 98 | 96 |

As shown in Table 1, it was confirmed that the tires of the examples have excellent uneven wear resistance and can suppress uneven wear such as H&T wear. It was also confirmed that the tires of the examples exhibited excellent steering stability. It was also confirmed that the tires of the examples maintained the braking performance.

[Clause]

The following clauses are disclosed regarding the above-described embodiments.

[Clause 1]

A tire comprising:
a tread portion comprising:
axially spaced first and second tread edges that are axially outermost edges of a ground contacting patch of the tire which occurs under a condition such that a 70% standard tire load is applied to the tire placed under a normal state, wherein the normal state is such that the tire is mounted onto a standard wheel rim and inflated to a standard pressure:
a first shoulder land portion including the first tread edge; and
a first shoulder circumferential groove located inwardly in a tire axial direction of and adjacent to the first shoulder land portion and extending continuously in a tire circumferential direction,
wherein
the first shoulder land portion is provided with a plurality of first shoulder lateral grooves extending from the first shoulder circumferential groove across the first tread edge,
each of the plurality of first shoulder lateral grooves has a pair of first groove walls, and
the pair of first groove walls is provided with a pair of first chamfer portions that extends from the first shoulder circumferential groove to a first location beyond the first tread edge.

[Clause 2]

The tire according to clause 1, wherein
the pair of first chamfer portions terminates at the first location, and
the first shoulder lateral grooves comprise a pair of non-chamfered groove edges that extends outwardly in the tire axial direction from the first location of the pair of first groove walls.

[Clause 3]

The tire according to clause 2, wherein
the first location is a location within 5 mm from the first tread edge.

[Clause 4]

The tire according to any one of clauses 1 to 3, wherein the pair of first chamfer portions has a chamfer width reducing outwardly in the tire axial direction.

[Clause 5]

The tire according to any one of clauses 1 to 4,
the tread portion further comprising:
a second shoulder land portion including the second tread edge; and
a second shoulder circumferential groove located inwardly in the tire axial direction of and adjacent to the second shoulder land portion and extending continuously in the tire circumferential direction, wherein
the second shoulder land portion is provided with a plurality of second shoulder lateral grooves extending from the second shoulder circumferential groove across the second tread edge,
each of the second shoulder lateral grooves has a pair of second groove walls, and
the pair of second groove walls is provided with a pair of second chamfer portions that extends from the second shoulder circumferential groove to a second location beyond the second tread edge.

[Clause 6]

The tire according to clause 5, wherein
the tread portion has a designated mounting direction to a vehicle such that the first tread edge is located on an outside of a vehicle when mounted on the vehicle,
the first shoulder land portion comprises a plurality of first shoulder blocks divided by the plurality of first shoulder lateral grooves,
the second shoulder land portion comprises a plurality of second shoulder blocks divided by the plurality of second shoulder lateral grooves, and
a ground contact surface area of one of the plurality of first shoulder blocks is greater than a ground contacting surface area of one of the plurality of second shoulder blocks.

[Clause 7]

The tire according to clause 5 or 6, wherein
no sipes nor grooves are provided on the first shoulder land portion except for the plurality of first shoulder lateral grooves.

[Clause 8]

The tire according to any one of clauses 5 to 7, wherein
the second shoulder land portion is provided with a plurality of shoulder sipes extending along the plurality of second shoulder lateral grooves.

[Clause 9]

The tire according to any one of clauses 5 to 8, wherein
at least one of the plurality of first shoulder lateral grooves is provided with a first tie-bar where a groove bottom thereof raises locally,
at least one of the plurality of second shoulder lateral grooves is provided with a second tie-bar where a groove bottom thereof raises locally, and a length in the tire axial direction of the first tie-bar is greater than a length in the tire axial direction of the second tie-bar.

[Clause 10]

The tire according to clause 9, wherein a depth of the first tie-bar is greater than a depth of the second tie-bar.

What is claimed is:

1. A tire comprising:
a tread portion comprising:
axially spaced first and second tread edges that are axially outermost edges of a ground contacting patch of the tire which occurs under a condition such that a 70% standard tire load is applied to the tire placed under a normal state, wherein the normal state is such that the tire is mounted onto a standard wheel rim and inflated to a standard pressure;
a first shoulder land portion including the first tread edge; and
a first shoulder circumferential groove located inwardly in a tire axial direction of and adjacent to the first shoulder land portion and extending continuously in a tire circumferential direction,
wherein
the first shoulder land portion is provided with a plurality of first shoulder lateral grooves extending from the first shoulder circumferential groove across the first tread edge;
each of the plurality of first shoulder lateral grooves has a pair of first groove walls;
the pair of first groove walls is provided with a pair of first chamfer portions that extends from the first shoulder circumferential groove to a first location beyond the first tread edge;
each of the plurality of first shoulder lateral grooves has a first groove width at the first shoulder circumferential groove and a second groove width at the first tread edge, wherein the first groove width is greater than the second groove width;
the pair of first chamfer portions terminates at the first location;
the first shoulder lateral grooves comprise a pair of non-chamfered groove edges that extends outwardly in the tire axial direction from the first location of the pair of first groove walls; and
the first location is a location within 5 mm from the first tread edge.

2. The tire according to claim 1, wherein the pair of first chamfer portions has a chamfer width reducing outwardly in the tire axial direction.

3. The tire according to claim 1, wherein the tread portion further comprises:
a second shoulder land portion including the second tread edge; and
a second shoulder circumferential groove located inwardly in the tire axial direction of and adjacent to the second shoulder land portion and extending continuously in the tire circumferential direction,
wherein
the second shoulder land portion is provided with a plurality of second shoulder lateral grooves extending from the second shoulder circumferential groove across the second tread edge,
each of the second shoulder lateral grooves has a pair of second groove walls, and
the pair of second groove walls is provided with a pair of second chamfer portions that extends from the second shoulder circumferential groove to a second location beyond the second tread edge.

4. The tire according to claim 3, wherein
the tread portion has a designated mounting direction to a vehicle such that the first tread edge is located on an outside of a vehicle when mounted on the vehicle,
the first shoulder land portion comprises a plurality of first shoulder blocks divided by the plurality of first shoulder lateral grooves,
the second shoulder land portion comprises a plurality of second shoulder blocks divided by the plurality of second shoulder lateral grooves, and
a ground contact surface area of one of the plurality of first shoulder blocks is greater than a ground contacting surface area of one of the plurality of second shoulder blocks.

5. The tire according to claim 3, wherein no sipes nor grooves are provided on the first shoulder land portion except for the plurality of first shoulder lateral grooves.

6. The tire according to claim 3, wherein the second shoulder land portion is provided with a plurality of shoulder sipes extending along the plurality of second shoulder lateral grooves.

7. The tire according to claim 3, wherein
at least one of the plurality of first shoulder lateral grooves is provided with a first tie-bar where a groove bottom thereof raises locally,
at least one of the plurality of second shoulder lateral grooves is provided with a second tie-bar where a groove bottom thereof raises locally, and
a length in the tire axial direction of the first tie-bar is greater than a length in the tire axial direction of the second tie-bar.

8. The tire according to claim 7, wherein a depth of the first tie-bar is greater than a depth of the second tie-bar.

9. The tire according to claim 1, wherein
at least one of the plurality of first shoulder lateral grooves is provided with a first tie-bar where a groove bottom thereof raises locally, and
a groove width of the at least one of the plurality of first shoulder lateral grooves enlarges from the first tread edge toward the first circumferential shoulder groove in a first tie-bar region.

10. The tire according to claim 9, wherein a groove width of the at least one of the plurality of first shoulder lateral grooves is constant from an axially outer end of the first tie-bar to the first tread edge.

11. The tire according to claim 10, wherein a groove width of the at least one of the plurality of first shoulder lateral grooves reduces from the first tread edge to an axially outermost end thereof.

12. The tire according to claim 1, wherein
each first chamfer portion comprises a constant-width portion having a constant chamfer width, and a variable-width portion having a chamfer width varying in a longitudinal direction of the first shoulder lateral groove,
the constant-width portion extends axially outwardly from the first shoulder circumferential groove to a location before the first tread edge,
the variable-width portion is connected to the constant-width portion and extends to the first location, and
the chamfer width of the variable-width portion reduces continuously toward outwardly in the tire axial direction.

13. The tire according to claim 12, wherein a length in the tire axial direction of the variable-width portion is in a range of from 30% to 45% of a width in the tire axial direction of a ground contacting surface of the first shoulder land portion.

14. The tire according to claim 13, wherein each first shoulder lateral groove comprises a pair of non-chamfered groove edges that extends outwardly in the tire axial direction from the first location.

15. The tire according to claim 12, wherein each first shoulder lateral groove comprises a pair of non-chamfered groove edges that extends outwardly in the tire axial direction from the first location.

16. The tire according to claim 15, wherein a length of the non-chamfered groove edges which is a periphery length in a view when the tread portion is developed on a plane, is in a range of from 40% to 70% of a width in the tire axial direction of the first shoulder land portion.

17. The tire according to claim 1, wherein
a chamfer width of the pair of first chamfer portions which is measured along an outer surface of the first shoulder land portion is in a range of 1 to 3 mm,
a chamfer depth of the pair of first chamfer portions is in a range of 1 to 3 mm, and
the pair of first chamfer portions has a pair of inclined chamfer surfaces.

18. The tire according to claim 1, wherein an angle of a pair of inclined chamfer surfaces of the pair of first chamfer portions with respect to a tire normal is in a range of from 40 to 60 degrees.

19. A tire comprising a tread portion that comprises:
axially spaced first and second tread edges that are axially outermost edges of a ground contacting patch of the tire which occurs under a condition such that a 70% standard tire load is applied to the tire placed under a normal state, wherein the normal state is such that the tire is mounted onto a standard wheel rim and inflated to a standard pressure;
a first shoulder land portion including the first tread edge; and
a first shoulder circumferential groove located inwardly in a tire axial direction of and adjacent to the first shoulder land portion and extending continuously in a tire circumferential direction, wherein
the first shoulder land portion is provided with a plurality of first shoulder lateral grooves extending from the first shoulder circumferential groove across the first tread edge;
each of the plurality of first shoulder lateral grooves has a pair of first groove walls;
the pair of first groove walls is provided with a pair of first chamfer portions that extends from the first shoulder circumferential groove to a first location beyond the first tread edge;
each of the plurality of first shoulder lateral grooves has a first groove width at the first shoulder circumferential groove and a second groove width at the first tread edge, wherein the first groove width is greater than the second groove width;
each first chamfer portion comprises a constant-width portion having a constant chamfer width and a variable-width portion having a chamfer width varying in a longitudinal direction of the first shoulder lateral groove, wherein the constant-width portion extends axially outwardly from the first shoulder circumferential groove to a location before the first tread edge, the variable-width portion is connected to the constant-width portion and extends to the first location, and the chamfer width of the variable-width portion reduces continuously toward outwardly in the tire axial direction; and
the first location is a location within 5 mm from the first tread edge.

* * * * *